(12) United States Patent  
Su et al.

(10) Patent No.: US 10,338,726 B2  
(45) Date of Patent: Jul. 2, 2019

(54) MOBILE DEVICE AND METHOD OF DISTINGUISHING BETWEEN DIFFERENT TOUCH FORCES

(71) Applicant: EVERDISPLAY OPTRONICS (SHANGHAI) LIMITED, Shanghai (CN)

(72) Inventors: Wei Sheng Su, Shanghai (CN); Jr-Hong Chen, Shanghai (CN); Hsiao-Yi Lin, Shanghai (CN); Feng-Shuen Huang, Shanghai (CN)

(73) Assignee: EverDisplay Optronics (Shanghai) Limited, Shanghai (CN)

( * ) Notice: Subject to any disclaimer, the term of this patent is extended or adjusted under 35 U.S.C. 154(b) by 351 days.

(21) Appl. No.: 15/227,393

(22) Filed: Aug. 3, 2016

(65) Prior Publication Data

US 2017/0269766 A1    Sep. 21, 2017

(30) Foreign Application Priority Data

Mar. 17, 2016   (CN) .......................... 2016 1 0152569

(51) Int. Cl.
*G06F 3/041* (2006.01)
*G06F 3/01* (2006.01)
*G06F 3/044* (2006.01)

(52) U.S. Cl.
CPC ............ *G06F 3/0416* (2013.01); *G06F 3/017* (2013.01); *G06F 3/044* (2013.01)

(58) Field of Classification Search
CPC .......... G06F 3/0416; G06F 3/017; G06F 3/044
See application file for complete search history.

(56) References Cited

U.S. PATENT DOCUMENTS

| | | | |
|---|---|---|---|
| 9,244,562 B1* | 1/2016 | Rosenberg | G06F 3/04847 |
| 2009/0085881 A1* | 4/2009 | Keam | G06F 3/0416 345/173 |
| 2010/0201615 A1* | 8/2010 | Tupman | G06F 1/1626 345/156 |
| 2013/0154938 A1* | 6/2013 | Arthur | G06F 3/041 345/168 |
| 2013/0321337 A1* | 12/2013 | Graham | G06F 3/03547 345/174 |
| 2015/0185923 A1* | 7/2015 | Yoon | G06F 3/044 345/174 |

(Continued)

*Primary Examiner* — Amare Mengistu
*Assistant Examiner* — Jennifer L Zubajlo
(74) *Attorney, Agent, or Firm* — Yunling Ren (57) ABSTRACT

The present disclosure provides a mobile device and a method of distinguishing between different touch forces. The method includes steps of: preloading an area of a maximum touch region with a maximum force, presetting a relationship among a current force, an area of a current touch region, the maximum force and the area of the maximum touch region, and presetting at least two force levels, wherein each of the at least two force levels corresponds to a respective range of a ratio of the current force to the maximum force; detecting and calculating the area of the current touch region of the touch component when touched; according to the relationship, calculating the ratio of the current force to the maximum force by using the area of the current touch region, so as to determine a corresponding one of the at least two force levels.

18 Claims, 9 Drawing Sheets

(56) References Cited

U.S. PATENT DOCUMENTS

| | | | |
|---|---|---|---|
| 2016/0034069 A1* | 2/2016 | Kohei | G06F 3/044 345/174 |
| 2016/0259458 A1* | 9/2016 | Johansson | G06F 3/0414 |
| 2016/0299628 A1* | 10/2016 | Ribeiro | G06F 3/0414 |
| 2018/0074637 A1* | 3/2018 | Rosenberg | G06F 3/03545 |

* cited by examiner

MOBILE DEVICE AND METHOD OF DISTINGUISHING BETWEEN DIFFERENT TOUCH FORCES

CROSS REFERENCE

This application claims priority to China Application Serial Number 201610152569.9, filed Mar. 17, 2016, which is herein incorporated by reference.

TECHNICAL FIELD

The present invention relates to data collection technology. More particularly, the present invention relates to systems and methods of adjusting data collection frequency.

BACKGROUND

Displays are widely used in electronic devices to display images, for example: an organic light emitting diode (OLED) displays using organic light-emitting material to generate light. In many electronic devices, the touch screen is functionally incorporated into the display. The touch screen can be used to provide the device with a touch interface. The touch interface allows users to touch the on-screen commands such as finger tapping and swipe to interact with the device.

A typical touch screen includes a touch sensor panel having a capacitive sensor array. The touch sensor processing circuit is capable of measuring changes in capacitance on the capacitance sensors to determine the touch position of the user's finger on the capacitive sensor array.

Currently, Force Touch is a technology developed by Apple Inc. Force Touch components are integrated in the back of the screen, so that the device can sense different levels of force, so as to perform different functions. However, the Force Touch components affect the outward appearance adversely. As a result, the border cannot be narrowed.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides a mobile device and a method of distinguishing between different touch forces without additional hardware, thereby solving or circumventing aforesaid problems and disadvantages.

In one embodiment, a method of distinguishing between different touch forces for a mobile device having a touch component includes steps of: (A) preloading an area of a maximum touch region of the touch component touched by a user's finger using at least one touch gesture with a maximum force, presetting a relationship among a current force, an area of a current touch region, the maximum force and the area of the maximum touch region, and presetting at least two force levels, wherein each of the at least two force levels corresponds to a respective range of a ratio of the current force to the maximum force; (C) detecting and calculating the area of the current touch region of the touch component when touched; (D) according to the relationship, calculating the ratio of the current force to the maximum force by using the area of the current touch region, so as to determine a corresponding one of the at least two force levels.

In another embodiment, a mobile device of distinguishing between different touch forces includes a panel having a touch component, a storage device, and a processor. The storage device is configured to preload an area of a maximum touch region of the touch component touched by a user's finger using at least one touch gesture with a maximum force, preset a relationship among a current force, an area of a current touch region, the maximum force and the area of the maximum touch region, and preset at least two force levels, wherein each of the at least two force levels corresponds to a respective range of a ratio of the current force to the maximum force. The processor is connected to the storage device and the touch component and is configured to calculate the area of the current touch region of the touch component when touched and calculate the ratio of the current force to the maximum force by using the area of the current touch region according to the relationship, so as to determine a corresponding one of the at least two force levels.

In view of the foregoing, according to embodiments of the present disclosure, the mobile device and the method can distinguish between different touch forces, without additional hardware Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

In the following detailed description, for purposes of explanation, numerous specific details are set forth in order to attain a thorough understanding of the disclosed embodiments. In accordance with common practice, like reference numerals and designations in the various drawings are used to indicate like elements/parts. Moreover, well-known elements or method steps are schematically shown or omitted in order to simplify the drawing and to avoid unnecessary limitation to the claimed invention.

In the detailed embodiment and the claims, unless otherwise indicated, the article "a" or "the" refers to one or more than one of the word modified by the article "a" or "the."

Through the present specification and the annexed claims, the description involving the "electrical connection" refers to the cases where one component is electrically connected to another component indirectly via other component(s), or one component is electrically connected to another component directly without any other component.

First Embodiment

Figure 1:
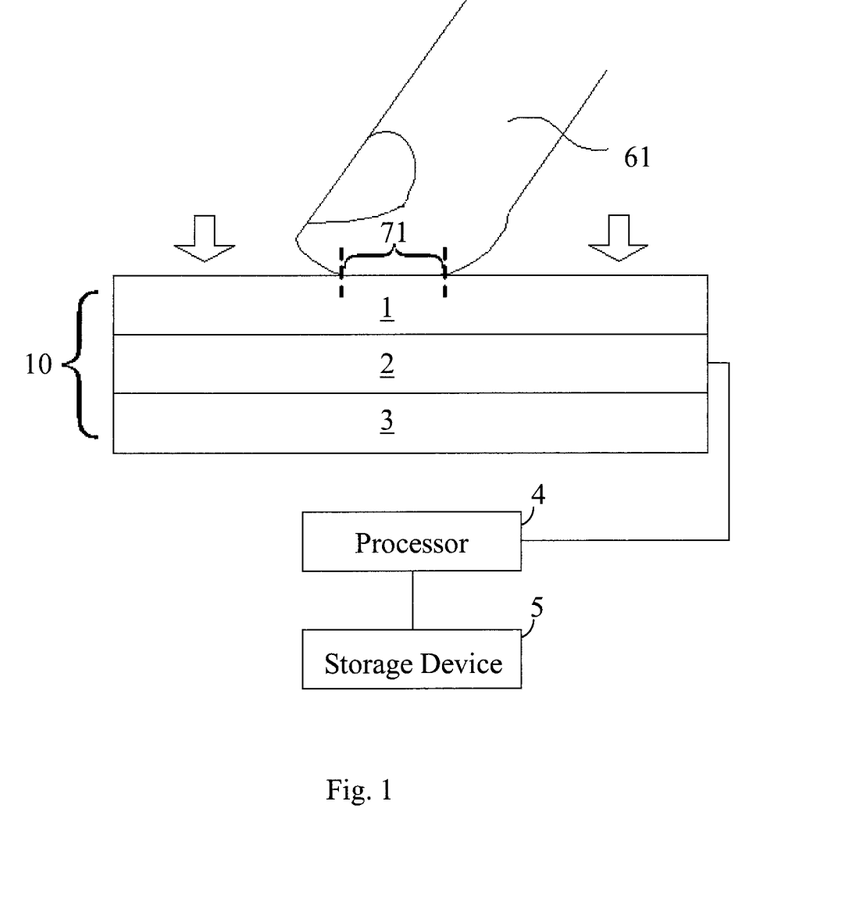
FIG. 1 is a schematic diagram of a mobile device according to a first embodiment of the present disclosure, in which the mobile device is touched by a user's finger using a front touch gesture with a maximum force.

As illustrated in FIG. 1, the present disclosure provides a mobile device executing a method of distinguishing between different touch forces includes a display panel 10, a processor 4 and a storage device 5. The display panel 10 includes a cover glass 1, touch component 2, and a display component 3, where the touch component 2 is sandwiched between the cover glass 1 and display component 3. The mobile device can be a mobile phone, a tablet, a laptop, an electronic paper, or the like. In some embodiments, the mobile device is the mobile phone having the display panel 10 for example, but the present disclosure is not limited thereto. The processor 4 can be integrated on the motherboard of the mobile phone, and it may be mobile phone chips or the like. The storage device 5 can be disposed in the mobile phone, and it may be ROM, a memory card or the like. The display panel 10 may be a panel of the mobile phone.

In some embodiments, the touch component is a capacitive sensor array, in which each capacitive sensor has a first state capacitance value when touched or a second state capacitance value when not touched, but the present disclosure is not limited thereto.

The storage device 5 preloads an area $S_{MAX}$ of a maximum touch region of the touch component 2 touched by a user's finger with a maximum force $F_{MAX}$. In some embodiments, the area $S_{MAX}$ of the maximum touch region is a maximum area standard. Then, whenever the user press the display panel 10 to generate a touch area, the touch area can be compared with the maximum area standard, so as to distinguish between different touch forces being applied to the display panel 10.

The storage device 5 presetting a relationship among a current force $F_{NOW}$, an area $S_{NOW}$ of a current touch region, the maximum force $F_{MAX}$ and the area $S_{MAX}$ of the maximum touch region.

In some embodiments, the relationship preset in the storage device 5 satisfies $F_{NOW}/F_{MAX}=(\sqrt{S_{NOW}}/\sqrt{S_{MAX}})$, but the present disclosure is not limited thereto. It should be noted that touch forces being applied to the touch component 2 is proportional to the square root of the touch area.

The storage device 5 presets at least two force levels, where each of the at least two force levels corresponds to a respective range of a ratio of the current force $F_{NOW}$ to the maximum force $F_{MAX}$. The processor 4 is connected to the storage device 5 and the touch component 2 and is configured to calculate the area $S_{NOW}$ of the current touch region of the touch component 2 when touched and calculate the ratio of the current force $F_{NOW}$ to the maximum force $F_{MAX}$ by using the area of the current touch region $S_{NOW}$ according to above relationship, so as to determine a corresponding one of the at least two force levels.

For example, the storage device 5 preloads two force levels including a first force level ranged from 0% to 50%, and a second force level ranged from 51% to S100%. Alternatively, the storage device 5 preloads three force levels including a first force level ranged from 0% to 60%, and a second force level ranged from 61% to 80%, and a third force level ranged from 81% to S100%. Alternatively, the storage device 5 preloads four force levels including a first force level ranged from 0% to 25%, and a second force level ranged from 26% to 50%, a third force level ranged from 51% to 75%, and a fourth force level ranged from 76% to S100%. Those with ordinary skill in the art may flexibly choose the number of the force levels depending on the desired application.

In some embodiments, the processor 4 is configured to count a total number of the capacitive sensors having the first state capacitance value when touched, so as to calculate the area $S_{NOW}$ of the current touch region under the current force $F_{NOW}$ and/or the area $S_{MAX}$ of the maximum touch region under the maximum force $F_{MAX}$. The processor 4 performs a corresponding operation according to the current force $F_{NOW}$.

Figure 2:
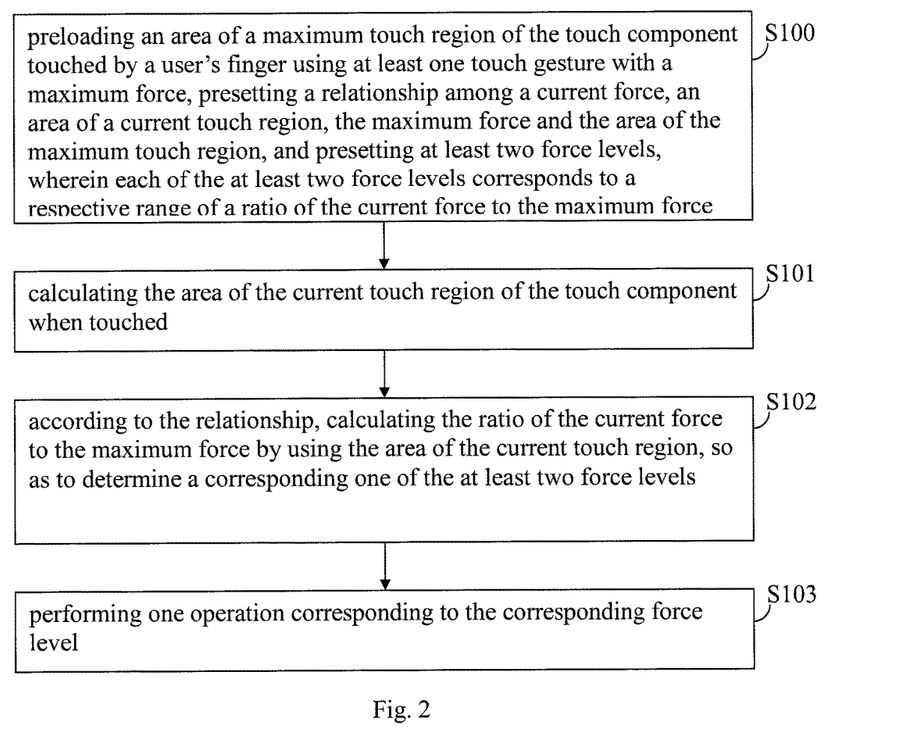
FIG. 2 is a flow chart of a method of distinguishing between different touch forces according to the first embodiment of the present disclosure.

As illustrated in FIG. 2, the present disclosure provides a method of distinguishing between different touch forces for a mobile device having a touch component includes steps as follows.

In step S100, the area $S_{MAX}$ of the maximum touch region of the touch component 2 touched by a user's finger using at least one touch gesture with the maximum force $F_{MAX}$ is preloaded.

In step S100, the relationship among a current force $F_{NOW}$, an area $S_{NOW}$ of a current touch region, the maximum force $F_{MAX}$ and the area $S_{MAX}$ of the maximum touch region is preset. In some embodiments, the relationship preset in the storage device 5 satisfies $F_{NOW}/F_{MAX}=(\sqrt{S_{NOW}}/\sqrt{S_{MAX}})$, but the present disclosure is not limited thereto.

In step S100, at least two force levels are preset, where each of the at least two force levels corresponds to a respective range of a ratio of the current force $F_{NOW}$ to the maximum force $F_{MAX}$. For example, two preset force levels including a first force level ranged from 0% to 50%, and a second force level ranged from 51% to S100%. Alternatively, three preset force levels including a first force level ranged from 0% to 60%, and a second force level ranged from 61% to 80%, and a third force level ranged from 81% to S100%. Alternatively, four preset force levels including a first force level ranged from 0% to 25%, and a second force level ranged from 26% to 50%, a third force level ranged from 51% to 75%, and a fourth force level ranged from 76% to S100%. Those with ordinary skill in the art may flexibly choose the number of the force levels depending on the desired application. However, five or more force levels may result in misuse. Two or three force levels are better for the user to operate.

In step S100, at least two different operations are preset. Each operation corresponds to the respective force level. Each operation is preset according to the respective force level may be confirmation, return back to the main page, open the function menu or the like, but the present disclosure is not limited thereto.

In step S101, the area $S_{MAX}$ of the current touch region of the touch component 2 is calculated when touched under the current force $F_{NOW}$. In some embodiments, the touch component is a capacitive sensor array, in which each capacitive sensor has a first state capacitance value when touched or a second state capacitance value when not touched, and the area $S_{MAX}$ of the current touch region is calculated by counting a total number of the capacitive sensors having the first state capacitance value when touched.

In step S102, according to the relationship among the current force $F_{NOW}$, the area $S_{NOW}$ of the current touch region, the maximum force $F_{MAX}$ and the area $S_{MAX}$ of the maximum touch region, the ratio of the current force $F_{NOW}$ to the maximum force $F_{MAX}$ is calculated by using the area of the current touch region $S_{NOW}$, so as to determine a corresponding one of the at least two force levels.

In step S103, one operation is performed according to the corresponding force level as determined in the step S102.

Figure 3:
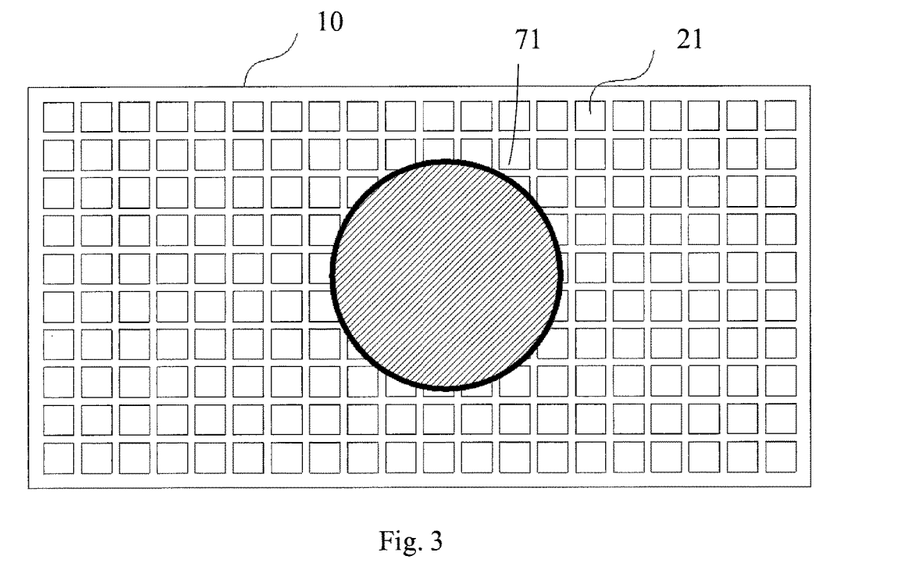
FIG. 3 is a schematic diagram illustrating an area of a maximum touch region of the mobile device touched by the user's finger using the front touch gesture with the maximum force.

Refer to FIGS. 1 and 3, the user uses one finger 61 to press the display panel 10, and a region of the capacitive sensor array 21 of the touch component 2 is pressed. The processor 4 is configured to calculate the area of the current touch region of the touch component 2 when touched to act as the area $S_{MAX}$ of the maximum touch region. As illustrated in FIG. 3, the area 71 is the area $S_{MAX}$ of the maximum touch region touched by the finger 61 using the front touch gesture and may be S10000 units, but the present disclosure is not limited thereto. The ratio of the current force $F_{NOW}$ to the maximum force $F_{MAX}$ is ranged from 0% to 50% as the first force level (i.e., slight touch). The ratio of the current force $F_{NOW}$ to the maximum force $F_{MAX}$ is ranged from 51% to S100% as the second force level (i.e., heavy touch).

Figure 4:
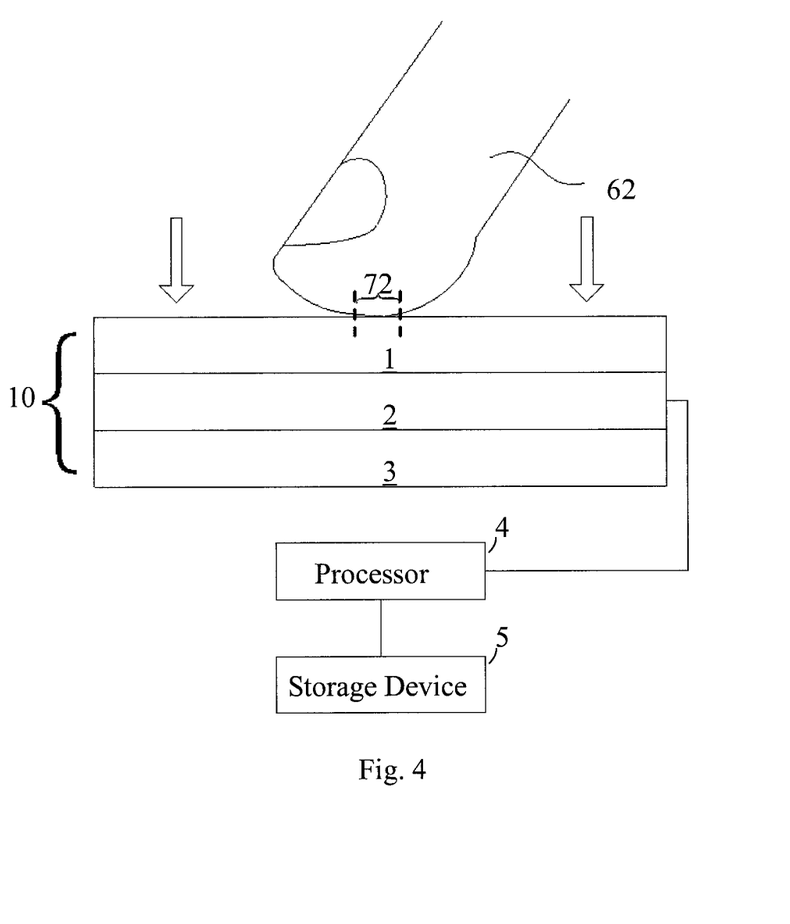
FIG. 4 is a schematic diagram illustrating the mobile device touched by the user's finger using the front touch gesture with a current force.
Figure 5:
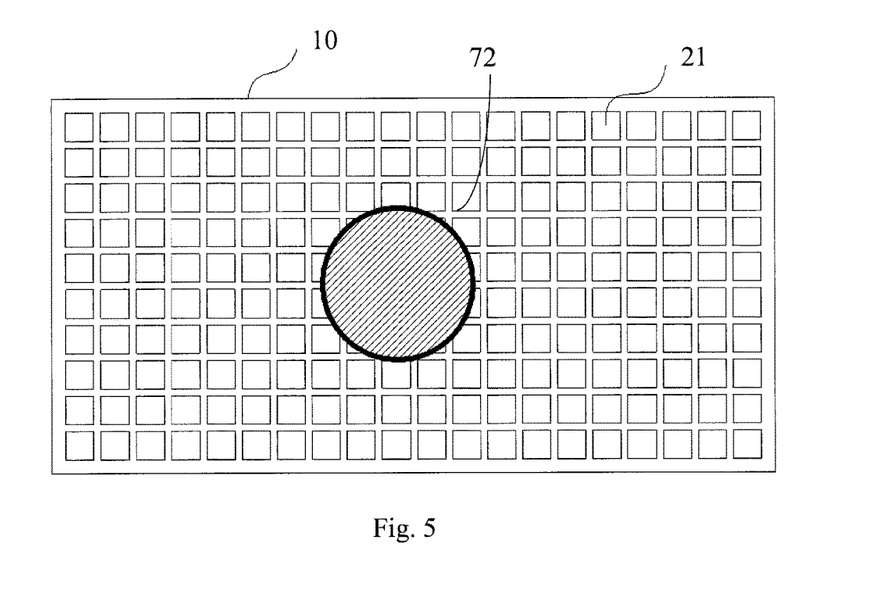
FIG. 5 is a schematic diagram illustrating an area of a current touch region of the mobile device touched by the user's finger using the front touch gesture with the current force.

In subsequent daily use, as illustrated in FIGS. 4 and 5, whenever the finger 62 to press the display panel 10. The processor 4 is configured to calculate the area $S_{NOW}$ of the current touch region of the touch component 2 when touched under the current force $F_{NOW}$. As illustrated in FIG. 5, the area 72 is the area $S_{NOW}$ of the current touch region touched by the finger 62 using the front touch gesture and may be 7000 units, but the present disclosure is not limited thereto. According to the relationship $F_{NOW}/F_{MAX}=(\sqrt{S_{NOW}}/\sqrt{S_{MAX}})$, the ratio of the current force $F_{NOW}$ to the maximum force $F_{MAX}$ is ranged from 84% for example, and the present disclosure is not limited thereto. The current force $F_{NOW}$ belongs to the second force level (i.e., heavy touch), so that the mobile device can performs the corresponding operation.

Although the present disclosure does not add hardware to actually measure physical values of the current force $F_{NOW}$ and the maximum force $F_{MAX}$, but uses the relationship between forces and touch areas to effectively distinguish between different touch forces applied on the mobile device.

Second Embodiment

In daily use, the user may use various touch gestures (e.g., the front touch gesture and a side touch gesture) to press the mobile device. Although the pressing forces may be the same, but the maximum areas of the front touch gesture and the side touch gesture are different. Therefore, the present disclosure detects different touch gestures, so as to catch the user's intent, for accurately distinguishing between different touch forces applied on the mobile device. Above two touch gestures are illustrated for example only, and those with ordinary skill in the art may flexibly choose various touch gestures depending on the desired application.

Figure 6:
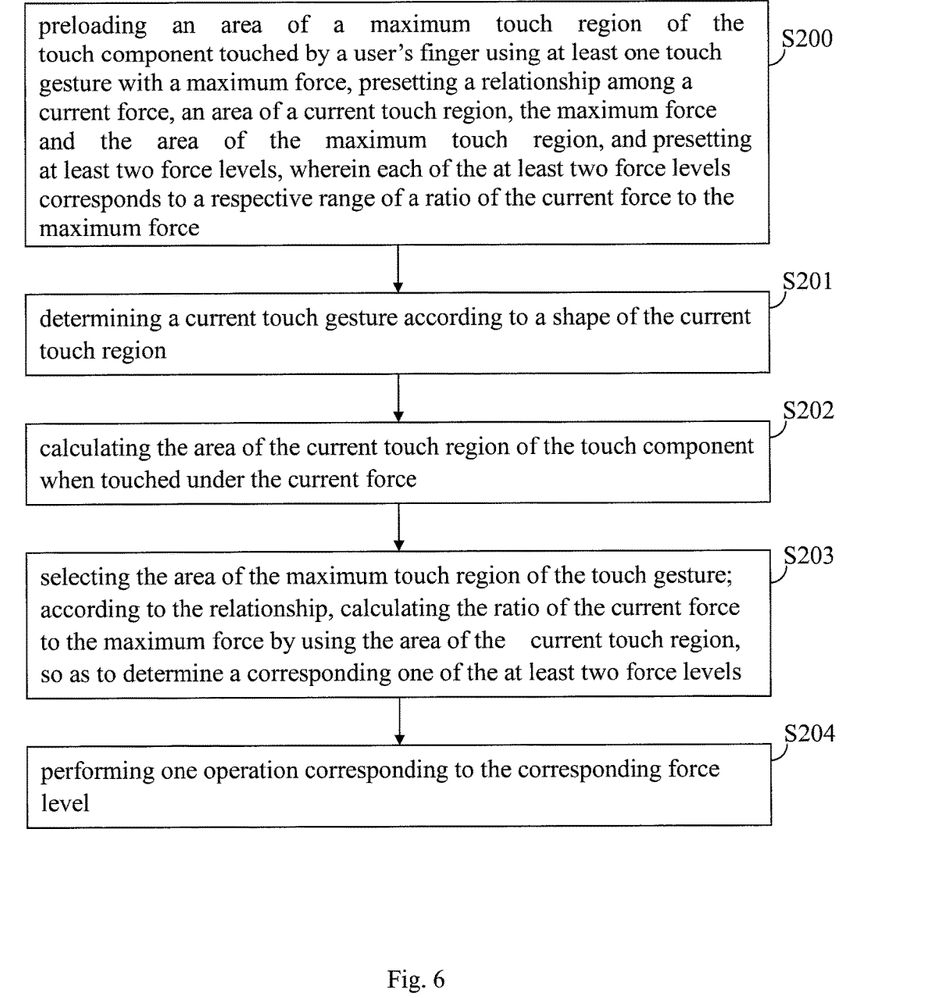
FIG. 6 is a flow chart of a method of distinguishing between different touch forces according to a second embodiment of the present disclosure.

As illustrated in FIG. 6, the present disclosure provides a method of distinguishing between different touch forces for a mobile device having the touch component includes steps as follows.

Figure 7:
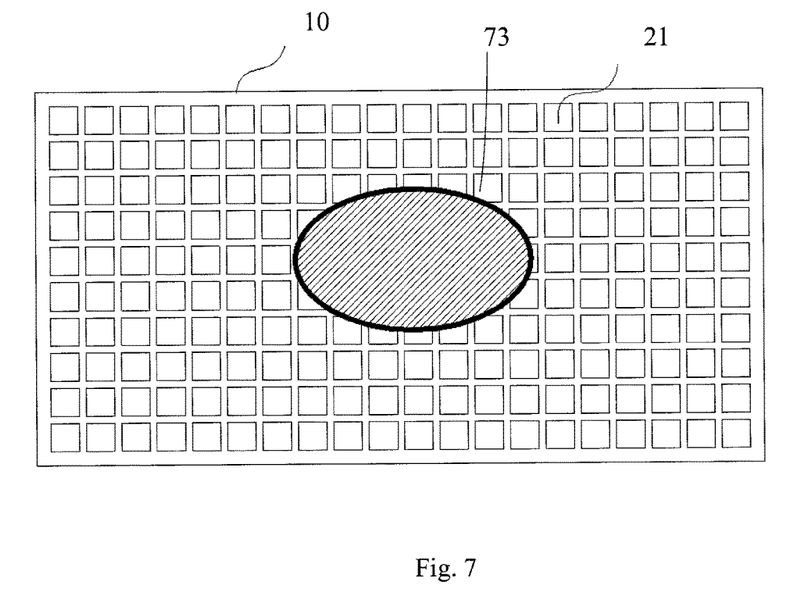
FIG. 7 is a schematic diagram illustrating an area of a maximum touch region of the mobile device touched by the user's finger using a side touch gesture with the maximum force.
Figure 8:
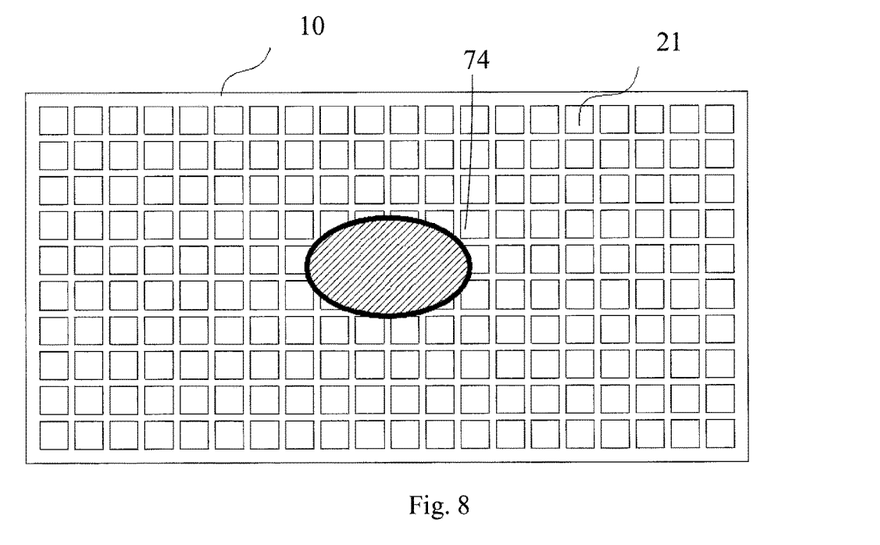
FIG. 8 is a schematic diagram illustrating an area of a current touch region of the mobile device touched by the user's finger using the side touch gesture with the current force.

In step S200, refer to FIGS. 3, 5, 7 and 8, the two area $S_{MAX}$ of the two maximum touch region of the touch component 2 touched by the user's finger using the front and side touch gestures with the respective two maximum force $F_{MAX}$ are preloaded. As illustrated in FIG. 3, the area 71 is the area $S_{MAX}$ of the maximum touch region touched by the finger 61 using the front touch gesture. As illustrated in FIG. 5, the area 72 is the area $S_{NOW}$ of the current touch region touched by the finger 62 using the front touch gesture. As illustrated in FIG. 7, the area 73 is the area $S_{MAX}$ of the maximum touch region touched by the finger using the side touch gesture. As illustrated in FIG. 8, the area 74 is the area $S_{NOW}$ of the current touch region touched by the finger 62 using the side touch gesture. In step S200, a round-like shape of one touch region corresponding to the front touch gesture, and an oval-like shape of the other two touch region corresponding to the side touch gesture are preloaded.

In step S200, the relationship among a current force $F_{NOW}$, an area $S_{NOW}$ of a current touch region, the maximum force $F_{MAX}$ and the area $S_{MAX}$ of the maximum touch region is preset. In some embodiments, the relationship preset in the storage device 5 satisfies $F_{NOW}/F_{MAX}=(\sqrt{S_{NOW}}/\sqrt{S_{MAX}})$, but the present disclosure is not limited thereto.

In step S200, at least two force levels are preset, where each of the at least two force levels corresponds to a respective range of a ratio of the current force $F_{NOW}$ to the maximum force $F_{MAX}$. For example, two preset force levels including a first force level ranged from 0% to 50%, and a second force level ranged from 51% to S100%. Alternatively, three preset force levels including a first force level ranged from 0% to 60%, and a second force level ranged from 61% to 80%, and a third force level ranged from 81% to S100%. Alternatively, four preset force levels including a first force level ranged from 0% to 25%, and a second force level ranged from 26% to 50%, a third force level ranged from 51% to 75%, and a fourth force level ranged from 76% to S100%. Those with ordinary skill in the art may flexibly choose the number of the force levels depending on the desired application. However, five or more force levels may result in misuse. Two or three force levels are better for the user to operate.

In step S200, at least two different operations corresponding to the two force levels respectively under any of above two touch gestures are preset. No matter whether the front touch gesture or the side touch gesture is used, one operation is determined according to the corresponding force levels as calculated. For example, when the front touch gesture with the heavy touch occurs, or when the side touch gesture with heavy touch occurs, a first operation is performed; when the front touch gesture with the slight touch occurs, or when the side touch gesture with slight touch occurs, a second operation is performed.

In step S201, a current touch gesture according to a shape of the current touch region is determined. For example, a pattern recognition technology detects the aspect ratio of the current touch region, the outline of the current touch region and so forth, to determine whether the current touch region is the round-like shape or the oval-like shape, thereby determining whether the user's finger uses the front touch gesture or the side touch gesture, but the present disclosure is not limited thereto. Those with ordinary skill in the art may flexibly choose another pattern recognition technology depending on the desired application.

In step S202, the area $S_{MAX}$ of the current touch region of the touch component 2 is calculated when touched under the current force $F_{NOW}$. In some embodiments, the touch component is a capacitive sensor array, in which each capacitive sensor has a first state capacitance value when touched or a second state capacitance value when not touched, and the area $S_{MAX}$ of the current touch region is calculated by counting a total number of the capacitive sensors having the first state capacitance value when touched. In some embodiments, the order of the step S201 (determining shape) and the step S202 (calculating area) may be exchanged, or the step S201 and the step S202 are preformed synchronously, but the present disclosure is not limited thereto.

In step S203, according to the preset relationship, the ratio of the current force $F_{NOW}$ to the maximum force $F_{MAX}$ is calculated by using the area $S_{NOW}$ of the current touch region, so as to determine a corresponding one of the at least two force levels. When the front touch gesture is determined, the area $S_{NOW}$ of the current touch region is compared with the area $S_{MAX}$ of the maximum touch region of the front touch gesture, so as to calculate the ratio. When the side touch gesture is determined, the area $S_{NOW}$ of the current touch region is compared with the area $S_{MAX}$ of the maximum touch region of the side touch gesture, so as to calculate the ratio.

In step 204, one operation is performed according to the corresponding force level as determined in the step S203. No matter whether the front touch gesture or the side touch gesture is used, the one operation is determined according to the corresponding force levels as calculated.

Compared with the first embodiment, the second embodiment detects different touch gestures, so as to accurately distinguish between different touch forces applied on the mobile device, thereby avoiding the error determination of pressing force by the interference of different gestures.

Third Embodiment

In daily use, it is difficult for the user to accurately control three or four levels of force being applied to the mobile device. However, it is easy for the user to use the front touch gesture or the side touch gesture. In order to create the diversity in pressing input, the present disclosure combines two parameters (i.e., the touch gesture and the pressing force) to easily identify respective input manners.

Figure 9:
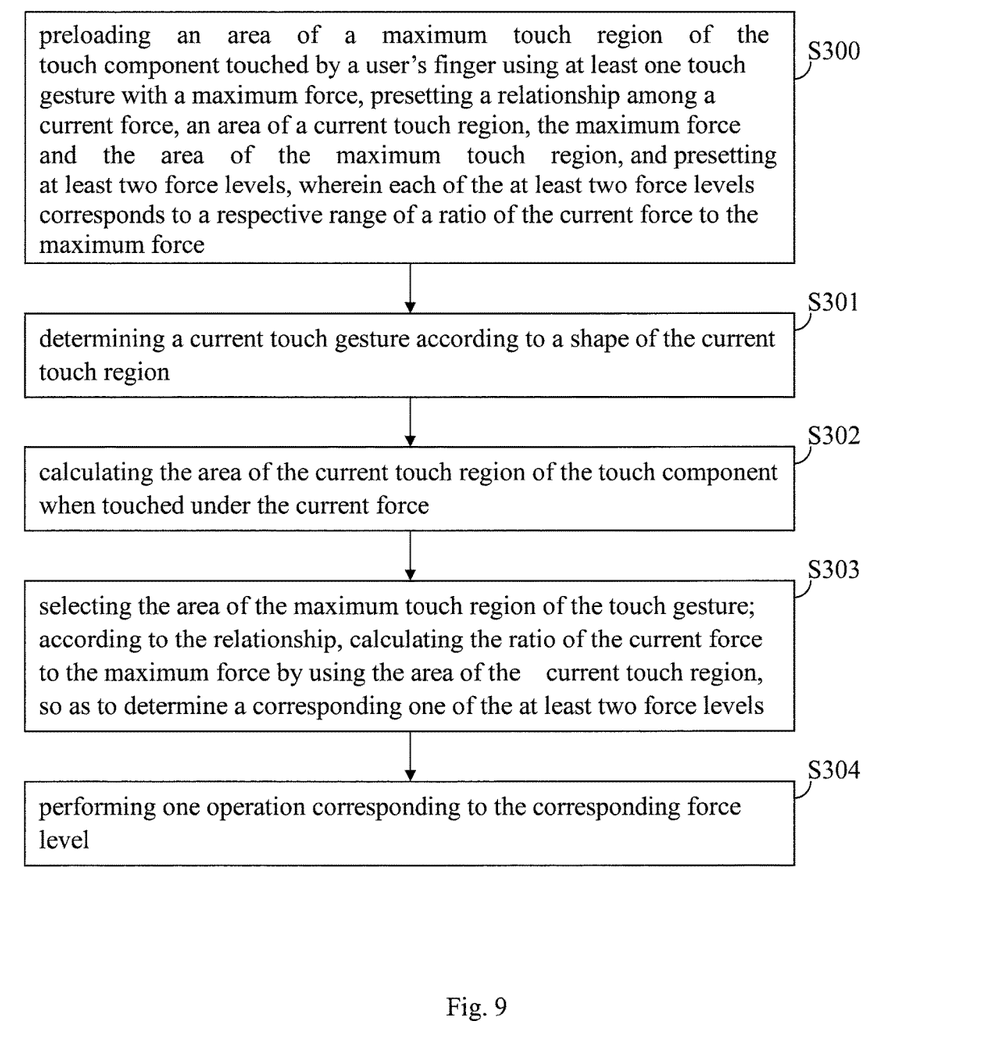
FIG. 9 is a flow chart illustrating a method of distinguishing between different touch forces according to a third embodiment of the present disclosure.

As illustrated in FIG. 9, the present disclosure provides a method of distinguishing between different touch forces for a mobile device having the touch component includes steps as follows.

In step 300, the relationship among a current force $F_{NOW}$ an area $S_{NOW}$ of a current touch region, the maximum force $F_{MAX}$ and the area $S_{MAX}$ of the maximum touch region is preset. In some embodiments, the relationship preset in the storage device 5 satisfies $F_{NOW}/F_{MAX}=(\sqrt{S_{NOW}}/\sqrt{S_{MAX}})$, but the present disclosure is not limited thereto.

In step 300, at least two force levels are preset, where each of the at least two force levels corresponds to a respective range of a ratio of the current force $F_{NOW}$ to the maximum force $F_{MAX}$ For example, two preset force levels including a first force level ranged from 0% to 50%, and a second force level ranged from 51% to S100%. Alternatively, three preset force levels including a first force level ranged from 0% to 60%, and a second force level ranged from 61% to 80%, and a third force level ranged from 81% to S100%. Alternatively, four preset force levels including a first force level ranged from 0% to 25%, and a second force level ranged from 26% to 50%, a third force level ranged from 51% to 75%, and a fourth force level ranged from 76% to S100%. Those with ordinary skill in the art may flexibly choose the number of the force levels depending on the desired application. However, five or more force levels may result in misuse. Two or three force levels are better for the user to operate.

In step 300, at least two different operations are preset, in which each of the two different operations corresponds to a respective one of the two force levels under a respective one of the two touch gestures. Under the front touch gesture, different force levels correspond to different operations; under the side touch gesture, different force levels correspond to another different operations. The operation is determined on the basis of the touch gesture and the force level. No matter whether the force level is high or low, the operation related to the front touch gesture and the operation related to the side touch gesture may be different, so as to create various input manners.

In step 301, a current touch gesture according to a shape of the current touch region is determined. For example, a pattern recognition technology detects the aspect ratio of the current touch region, the outline of the current touch region and so forth, to determine whether the current touch region is the round-like shape or the oval-like shape, thereby determining whether the user's finger uses the front touch gesture or the side touch gesture, but the present disclosure is not limited thereto. Those with ordinary skill in the art may flexibly choose another pattern recognition technology depending on the desired application.

In step 302, the area $S_{MAX}$ of the current touch region of the touch component 2 is calculated when touched under the current force $F_{NOW}$. In some embodiments, the touch component is a capacitive sensor array, in which each capacitive sensor has a first state capacitance value when touched or a second state capacitance value when not touched, and the area $S_{MAX}$ of the current touch region is calculated by counting a total number of the capacitive sensors having the first state capacitance value when touched. In some embodiments, the order of the step 301 (determining shape) and the step 302 (calculating area) may be exchanged, or the step 301 and the step 302 are preformed synchronously, but the present disclosure is not limited thereto.

In step 303, according to the preset relationship, the ratio of the current force $F_{NOW}$ to the maximum force $F_{MAX}$ is calculated by using the area $S_{NOW}$ of the current touch region, so as to determine a corresponding one of the at least two force levels. When the front touch gesture is determined, the area $S_{NOW}$ of the current touch region is compared with the area $S_{MAX}$ of the maximum touch region of the front touch gesture, so as to calculate the ratio. When the side touch gesture is determined, the area $S_{NOW}$ of the current touch region is compared with the area $S_{MAX}$ of the maximum touch region of the side touch gesture, so as to calculate the ratio.

In step 304, one operation is performed according to the touch gesture as determined in the step S201 and the corresponding force level as determined in the step S203.

Compared with the first embodiment, the third embodiment detects different touch gestures, so as to accurately distinguish between different touch forces applied on the mobile device, thereby avoiding the error determination of pressing force by the interference of different gestures.

Compared with the second embodiment, the third embodiment creates the diversity in pressing input, to easily identify respective input manners.

In view of the foregoing, according to embodiments of the present disclosure, the mobile device and the method can distinguish between different touch forces, without additional hardware.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A method of distinguishing between different touch forces for a mobile device having a touch component, comprising steps of:
   (A) preloading an area of a maximum touch region of the touch component touched by a user's finger using at least one touch gesture with a maximum force, presetting a relationship among a current force, an area of a current touch region, the maximum force and the area of the maximum touch region, and presetting at least two force levels, wherein each of the at least two force levels corresponds to a respective range of a ratio of the current force to the maximum force, the relationship satisfies $F_{NOW}/F_{MAX}=(\sqrt{S_{NOW}}/\sqrt{S_{MAX}})$, in which $F_{NOW}$ is the current force, $F_{MAX}$ is the maximum force, $S_{NOW}$ is the area of the current touch region, and $S_{MAX}$ is the area of the maximum touch region;
   (C) detecting and calculating the area $S_{NOW}$ of the current touch region of the touch component when touched;
   (D) according to the relationship, calculating the ratio $F_{NOW}/F_{MAX}$ of the current force to the maximum force by using the area $S_{NOW}$ of the current touch region, so as to determine a corresponding one of the at least two force levels based on the calculated ratio $F_{NOW}/F_{MAX}$.

2. The method of claim 1, wherein the step (A) comprises: preloading at least two areas of at least two maximum touch regions of the touch component touched by the user's fingers using at least two touch gestures with respective at least two maximum forces, and preloading respective shapes of at least two touch regions corresponding to the at least two touch gestures,
   wherein the method further comprises a step (B) of: determining a current touch gesture according to a shape of the current touch region after the step (A), and
   the step (D) comprises: determining a corresponding one of the at least two touch gestures matches the current touch gesture, and selecting one of the at least two areas of the respective at least two maximum touch regions of the corresponding one of the at least two touch gestures.

3. The method of claim 2, wherein the at least two touch gestures comprises a front touch gesture and a side touch gesture, and the step (A) further comprises: preloading a round-like shape of one of the at least two touch regions corresponding to the front touch gesture, and an oval-like shape of an other of the at least two touch regions corresponding to the side touch gesture.

4. The method of claim 2, wherein the step (A) further comprises presetting at least two different operations corresponding to the at least two force levels respectively under any of the at least two touch gestures, and
   the method further comprises a step (E) of: performing one of the at least two different operations according to the corresponding one of the at least two force levels as determined in the step (D).

5. The method of claim 2, wherein the step (A) further comprises presetting at least two different operations, each of the at least two different operations corresponds to a respective one of the at least two force levels under a respective one of the at least two touch gestures, and
   the method further comprises a step (E) of: performing one of the at least two different operations according to the current touch gesture as determined in the step (B) and the corresponding one of the at least two force levels as determined in the step (D).

6. The method of claim 1, wherein the step (A) further comprises presetting at least two different operations corresponding to the at least two force levels respectively, and
   the method further comprises a step (E) of: performing one of the at least two different operations, wherein the one of the at least two different operations corresponds to the corresponding one of the at least two force levels as determined in the step (D).

7. The method of claim 1, wherein the touch component is a capacitive sensor array, in which each capacitive sensor has a first state capacitance value when touched or a second state capacitance value when not touched, and the step (C) comprises: counting a total number of the capacitive sensors having the first state capacitance value when touched, so as to calculate the area of the current touch region.

8. The method of claim 1, wherein the at least two force levels comprises a first force level ranged from 0% to 50%, and a second force level ranged from 51% to S100%.

9. The method of claim 1, wherein the at least two force levels comprises a first force level ranged from 0% to 60%, and a second force level ranged from 61% to 80%, and a third force level ranged from 81% to S100%.

10. The method of claim 1, wherein the at least two force levels comprises a first force level ranged from 0% to 25%, and a second force level ranged from 26% to 50%, a third force level ranged from 51% to 75%, and a fourth force level ranged from 76% to S100%.

11. A mobile device of distinguishing between different touch forces, comprising:
   a panel having a touch component;
   a storage device configured to preload an area of a maximum touch region of the touch component touched by a user's finger using at least one touch gesture with a maximum force, preset a relationship among a current force, an area of a current touch region, the maximum force and the area of the maximum touch region, and preset at least two force levels, wherein each of the at least two force levels corresponds to a respective range of a ratio of the current force to the maximum force, the relationship satisfies $F_{NOW}/F_{MAX}=(\sqrt{S_{NOW}}/\sqrt{S_{MAX}})$, in which $F_{NOW}$ is the current force, $F_{MAX}$ is the maximum force, $S_{NOW}$ is the area of the current touch region, and $S_{MAX}$ is the area of the maximum touch region;
   a processor connected to the storage device and the touch component and configured to calculate the area $S_{NOW}$ of the current touch region of the touch component when touched and calculate the ratio $F_{NOW}/F_{MAX}$ of the current force to the maximum force by using the area $S_{NOW}$ of the current touch region according to the relationship, so as to determine a corresponding one of the at least two force levels based on the calculated ratio $F_{NOW}/F_{MAX}$.

12. The mobile device of claim 11, wherein the storage device preloads at least two areas of at least two maximum touch regions of the touch component touched by the user's fingers using at least two touch gestures with respective at least two maximum forces, and preloads respective shapes of at least two touch regions corresponding to the at least two touch gestures, wherein the processor configured to determine a current touch gesture according to a shape of the current touch region, and determine a corresponding one of the at least two touch gestures matches the current touch gesture, and selecting one of the at least two areas of the respective at least two maximum touch regions of the corresponding one of the at least two touch gestures.

13. The method of claim 12, wherein the at least two touch gestures comprises a front touch gesture and a side touch gesture, and the storage device preloads a round-like shape of one of the at least two touch regions corresponding to the front touch gesture, and an oval-like shape of an other of the at least two touch regions corresponding to the side touch gesture.

14. The mobile device of claim 12, wherein the storage device preloads at least two different operations corresponding to the at least two force levels respectively under any of the at least two touch gestures, and the processor configured to perform one of the at least two different operations according to the corresponding one of the at least two force levels.

15. The mobile device of claim 12, wherein the storage device preloads at least two different operations, each of the at least two different operations corresponds to a respective one of the at least two force levels under a respective one of the at least two touch gestures, and the processor configured to perform one of the at least two different operations according to the current touch gesture and the corresponding one of the at least two force levels.

16. The mobile device of claim 11, wherein the storage device preloads at least two different operations corresponding to the at least two force levels respectively, and the processor configured to perform one of the at least two different operations, wherein the one of the at least two different operations corresponds to the corresponding one of the at least two force levels.

17. The mobile device of claim 11, wherein the touch component is a capacitive sensor array, in which each capacitive sensor has a first state capacitance value when touched or a second state capacitance value when not touched, and the processor configured to count a total number of the capacitive sensors having the first state capacitance value when touched, so as to calculate the area of the current touch region.

18. The mobile device of claim 11, wherein the at least two force levels comprises a first force level ranged from 0% to 50%, and a second force level ranged from 51% to S100%; or the at least two force levels comprises a first force level ranged from 0% to 60%, and a second force level ranged from 61% to 80%, and a third force level ranged from 81% to S100%; or the at least two force levels comprises a first force level ranged from 0% to 25%, and a second force level ranged from 26% to 50%, a third force level ranged from 51% to 75%, and a fourth force level ranged from 76% to S100%.

* * * * *